United States Patent Office 3,310,494
Patented Mar. 21, 1967

3,310,494
ICE MELTING COMPOSITION AND METHOD
Francis R. Sproule, Northville, and Leslie R. Bacon, Wyandotte, Mich., assignors to Wyandotte Chemicals Corporation, Wyandotte, Mich., a corporation of Michigan
No Drawing. Filed Apr. 16, 1964, Ser. No. 360,442
7 Claims. (Cl. 252—70)

This invention relates to ice melting. In one of its aspects it relates to a composition of matter useful for melting ice. In another one of its aspects it relates to a method of melting ice.

Today, ice melting is a very important problem. With the advent of modern highways, both tollways and freeways, it has become even more important than in the past to keep the highways clear in order to maintain normal flow of the large volume of traffic. This is especially true in the case of tollways where closed highways mean loss in revenue. In the past, calcium chloride and sodium chloride have been used for ice melting. More recently, mixtures of sodium chloride and calcium chloride have been used. While these materials have been effective, those in the art have been striving to develop new methods and compositions to obtain faster ice melting which will also be inexpensive and non-injurious to the surfaces upon which the ice is formed. Therefore, an object of the present invention is to provide a novel ice melting composition.

Another object of the present invention is to provide a novel method of melting ice.

The above and other objects that will become apparent as the specification proceeds have been accomplished by the composition and method of this invention.

In summary, the composition of this invention comprises solid particles of calcium chloride, sodium chloride or a mixture of calcium chloride and sodium chloride which are at least partially coated with a surface active agent.

It has been unexpectedly discovered that by incorporating certain surface active agents with calcium chloride and/or sodium chloride a composition is obtained that melts ice and snow faster than the untreated calcium or sodium chloride. The employment of the compositions of this invention for ice melting has brought about a significant increase in the rate of ice melting. For example, tests were conducted in which 27 minutes passed before meltwater began to flow from ice to which untreated rock salt was applied. Additional tests were then run in which the compositions of this invention were empolyed. It was found that, under the same test conditions and using identical amounts of rock salt which had been coated with a surfactant, the least effective ice melting composition of this invention reduced this period to 15 minutes, while the most effective composition reduced the period to only 5 minutes. Not only do the compounds of this invention initiate the melting of ice more quickly but they also melt a greater quantity of ice per unit of time as compared to calcium chloride or sodium chloride. Thus, it was found that rock salt which was partially coated with a surfactant melted 73 to 176 percent more ice during one hour (depending on the surfactant used) than that melted by untreated rock salt.

The surfactant materials which have been found to be effective in increasing the ice melting capabilities of sodium and calcium chloride particles are those having a molecular structure composed of both hydrophobic and hydrophilic elements. While any such material is suitable as a component of the compositions of this invention, it has been found that superior results are obtained if the surfactant is compatible with the basic ice melting material with which it will be used. That is, it is preferable that the surfactant be a compound which will not react physically or chemically with calcium chloride or sodium chloride so as to destroy the basic properties of either component. Likewise, it has been found that superior results are obtained if the surfactant is soluble, preferably in excess of the amount used, in the calcium chloride or salt brine meltwater.

One type of surfactant which has been found to be effective in this invention is the anionic surfactant having a general formula selected from the group consisting of R–SO$_3$X, R–OSO$_3$X and R–COOX where X represents alkali-metal, ammonium or substituted ammonium radical and R represents an organic radical containing at least one group having more than 8 carbon atoms and collectively containing a maximum of 25 carbon atoms, and

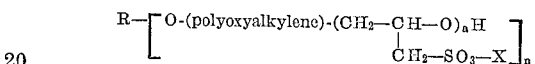

wherein R, together with attached oxygen, is the residue of an alcohol having from 1 to 6 carbon atoms and from 1 to 6 hydroxyl groups; wherein polyoxyalkylene represents a chain of oxyalkylene radicals having from 2 to 4 carbon atoms and mixtures thereof, and the molecular weight of said chain, including the molecular weight of said alcohol and multipled by the number $n$ being in the range of about 1000 to 10,000; wherein $a$ is a number in the range from 1 to about 4, and X is a cation, selected from the group consisting of sodium, potassium, ammonium, calcium, magnesium and alkylol-substituted ammonium in which each alkylol contains from 2 to 3 carbon atoms. Examples of such anionic surfactants are: (a) soaps such as sodium laurate, ammonium stearate, diethanol-ammonium oleate; (b) slkyl sulfonates such as dodecyl sodium sulfonate, cetyl potassium sulfonate; (c) alkyl sulfates such as sodium dodecyl sulfate, sodium oleyl sulfate; (d) sulfonated ethers of long and short chain aliphatic groups such as $C_{17}H_{33}$—O—$C_2H_4$—SO$_3$—Na; (e) sulfated ethers of long and short chain aliphatic groups such as $C_{17}H_{33}$—O—$C_2H_4$—O—SO$_3$Na; (f) sulfonated alkyl esters of long-chain fatty acids such as $$C_{17}H_{33}—CO—O—C_2H_4—SO_3Na$$

(g) sulfated glycol esters of long-chain fatty acids such as $C_{17}H_{33}$—CO—O—$C_2H_4$—O—SO$_3$Na; (h) sulfonated alkyl substituted amides of long-chain fatty acids such as $C_{17}H_{33}$—CO—NH—$C_2H_4$—SO$_3$Na and

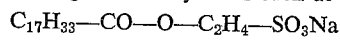

(i) alkylated aryl sulfonates such as isopropyl naphthalene sodium sulfonate and dodecyl benzene sodium sulfonate; (j) hydroaromatic sulfonates such as tetrahydronaphthalene sodium sulfonate; (k) alkyl sulfosuccinates such as dioctyl sodium sulfosuccinate; (l) polyether hydroxysulfonate condensation products such as those prepared by reacting an epihalohydrin with a polyether alcohol-alkylene oxide condensate and then sulfonating the halogen hydrin intermediate product; and (m) aryl sulfonate-formaldehyde condensation products such as the condensation product of formaldehyde and sodium naphthalene sulfonate

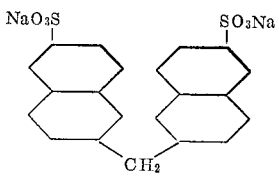

Another type of surfactant which is useful in this invention is the amine and quaternary ammonium cationic surfactants. Examples of such cationic materials are the (a) quaternary ammonium compounds containing up to about 30 carbon atoms in which at least one of the radicals attached to the nitrogen is an organic group having a minimum of 8 carbon atoms such as trimethyl octadecyl ammonium chloride, dimethyl hexadecyl octadecyl ammonium chloride, lauryl pyridinium chloride, cetyl dimethyl benzyl ammonium chloride and N-stearyl betaine; and (b) amines, amides and diamines, as well as their acid salts, containing up to about 30 carbon atoms and having at least one organic group containing a minimum of 8 carbon atoms such as octadecylamine acetate, hexadecyl di(polyoxyethylene) amine and oleyl diethylethylenediamine.

A further type of surfactant which can be used in the composition of this invention is the ampholytic surfactant such as sulfuric ester, sulfonic and carboxy acid ampholytes. Examples of such compounds are the alkyl amino acids and sulfated satuarted or unsaturated fatty acyl derivatives of aminoethylethanolamine.

Still another type of surfactant which may be used in this invention is the nonionic surface active agent. Examples of such materials are (a) monoethers of polyglycols with long-chain fatty alcohols such as the reaction product of ethylene oxide and oleyl alcohol

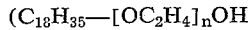

$(C_{18}H_{35}-[OC_2H_4]_nOH)$ where $n$ is 10 to 20; (b) monoesters of polyglycols with long-chain fatty acids, such as reaction products of ethylene oxide or polyethylene glycol with a long-chain fatty acid as oleic acid,

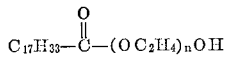

where $n$ is 10 to 20; (c) monoethers of polyglycols with alkylated phenols such as reaction products of ethylene oxide or polyethylene glycol with an alkyl phenol,

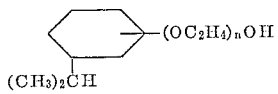

where $n$ is 10 to 20; (d) partial esters of polyhydric alcohols with long-chain monocarboxylic (fatty and/or resin) acids such as glycerol monostearate and sorbitan trioleate; (e) partial and complete esters of long-chain monocarboxylic (fatty and/or resin) acids with polyglycol ethers of polyhydric alcohols such as tristearic acid ester of polyglycol ether of sorbitan and hexaoleic acid ester of polyglycol ether of sorbitol; (f) condensation products of alkylene oxide with a base formed by the condensation of alkylene oxide with alkylene glycol; (g) condensation products of reactive hydrogen compounds and alkylene oxides having a minimum molecular weight of 400 and having the formula $Y(-P-E-H)_x$ in which Y is an organic compound having at least one reactive hydrogen atom, P is a hydrophobic polyoxyalkylene chain and E is a hydrophilic heteric polyoxyalkylene chain; and (h) polyoxyalkylene addition products of alkylenediamine.

The method by which the compositions of this invention are prepared is not critical and forms no part of this invention. Thus, the surfactant may simply be mixed with sodium chloride or calcium chloride pellets. Alternatively, the surfactant may be physically blended with the sodium or calcium chloride so as to form pellets composed of an integral mixture of surfactant and chloride. A method which has proved convenient is simply to spray the surfactant onto the sodium and/or calcium chloride pellets while they were being tumbled within a container. In many instances it was necessary to dissolve the surfactant or dilute it with water in order to secure the proper viscosity, etc., for spraying.

The quantity of surfactant required to increase the ice melting effectiveness of the chloride particles varies with the activity of the particular surfactant, the type of chloride and the particle size and surface area of the chloride.

In general, a sufficient quantity of surfactant will be present if the chloride particles are at least partially coated with surfactant. Experimentation has shown that a satisfactory partial coating is achieved if the chloride particles are contacted with a solution containing as little as 0.01 weight percent of surfactant based on the weight of the chloride particles. Highly successful tests were conducted in which up to about 0.16 weight percent of surfactant was used; however, it was found that excellent results were achieved with chloride pellets coated with about 0.08 weight percent of surfactant. Greater amounts of surfactant can be employed limited only by economic considerations. In this connection, surfactants classified as nonionic, cationic and anionic are preferred due to their wide availability and low costs.

The size of the surfactant coated chloride particles of this invention is not critical. When the compositions of this invention are used for de-icing and road maintenance, particles passing through a No. 3 mesh sieve but retained on a 20 mesh sieve have been found to be very satisfactory.

The following examples illustrate the new compositions of this invention as well as the superior results obtained when they are used as ice melting agents.

*Example I*

This example illustrates the effectiveness of ice melting compositions comprising sodium chloride particles which have been at least partially coated with a surfactant. The surfactant employed was an anionic material marketed under the trademark "Abex 18S" by the Alcolac Chemical Corporation. This surfactant was a pale yellow liquid having a density of 8.5 pounds per gallon, a pH of 8.6, a surface tension of 43 dynes per centimeter (1.0% soln.) and a viscosity at 25° C. of 500 cps.

A composition was prepared by placing 150 grams of rock salt of −4 to +10 mesh range into a pail mounted axially so as to rotate at a slight angle from the horizontal. While the rock salt pellets were being tumbled by rotation, they were sprayed with 0.69 milliliter of an aqueous solution of "Abex 18S." This solutoin contained about 0.08 weight percent of surfactant based on the weight of the rock salt.

The effectiveness of the above described ice melting composition was demonstrated by tests in which 5 grams of the composition was spread over the surface of 1 pound of crushed, drained ice contained in a 60° funnel. The meltwater produced by the action of the composition on the ice was then collected. The test was conducted in a chamber in which there was no air circulation and which was at a temperature of about −8° C. For comparison purposes, tests were conducted under the exact same conditions using rock salt which was not treated with the surfactant. The results of these tests are shown below:

TABLE I

| Time (min.) | Meltwater Volume (mls.) | |
|---|---|---|
| | NaCl and Surfactant | NaCl |
| 8 | 0.5 | 0 |
| 16 | 3.5 | 0 |
| 24 | 6 | 0 |
| 32 | 8.5 | 1 |
| 40 | 11 | 3 |
| 48 | 12.5 | 5 |
| 56 | 13.5 | 7 |
| 64 | 14.5 | 8 |
| 72 | 15 | 9 |
| 80 | 15.5 | 10 |

It will be noted that the ice melting composition of this invention not only melted a substantially greater amount of ice but also considerably reduced the period of time required to achieve significant ice melting.

*Example II*

This example illustrates the superior results obtained when 150 grams of calcium chloride was treated with the same amount of "Abex 18S" surfactant as described in Example I. The test conditions used were identical to those described in Example I. The calcium chloride was in the form of pellets screened to a −4 +16 mesh range. The data of Table II shown below reveals that the composition of this invention melted ice quicker and in greater quantity than did the calcium chloride.

TABLE II

| Time (min.) | Meltwater Volume (mls.) ||
| | CaCl₂ and Surfactant | CaCl₂ |
|---|---|---|
| 8 | 14 | 9 |
| 16 | 18 | 14 |
| 14 | 19 | 15 |
| 32 | 19 | 16 |

*Example III*

This example illustrates the effectiveness of ice melting compositions prepared by treating sodium chloride with a surface active agent having the formula:

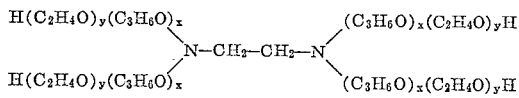

where $x$ is sufficiently large so as to provide a combined molecular weight of the oxypropylene chains of at least 900 and $y$ is sufficiently large so that the oxyethylene groups collectively constitute from 10 to 90 weight percent of the total molecular weight of the compound. Such products are marketed by Wyandotte Chemicals Corporation under the trademark Tetronic.

An ice melting composition was prepared by spraying 150 grams of −4 to +10 mesh rock salt with an aqueous solution of a compound of the above formula in which the oxypropylene and ethylene diamine had a combined molecular weight in the range of 2500 to 3000 and in which the oxyethylene content was in the range of 20 to 29 weight percent of the compound. The amount of surfactant sprayed onto the rock salt was about 0.08 weight percent of the salt.

Tests using the above composition were conducted exactly as described in Example I. The results of these tests are shown below and are contrasted to tests in which only rock salt was used as the ice melting agent.

TABLE III

| Time (min.) | Meltwater Volume (mls.) ||
| | NaCl and Surfactant | NaCl |
|---|---|---|
| 8 | 0.1 | 0 |
| 16 | 5.5 | 0 |
| 24 | 10.5 | 0 |
| 32 | 13.5 | 1 |
| 40 | 15.5 | 3 |
| 48 | 17.5 | 5 |
| 56 | 18.5 | 6.5 |
| 64 | 19.5 | 8 |
| 72 | 20 | 9 |
| 80 | 20.5 | 10 |

It will be noted that the ice melting composition of this invention melted as much ice in 24 minutes as was melted by the sodium chloride in the entire 80 minute period.

*Example IV*

The surfactant used in the tests reported in Example III was sprayed in a like amount onto calcium chloride pellets similar to those used in Example II. The resulting ice melting composition was then used in a test identical to that described in Example I. The results of this test are shown below:

TABLE IV

| Time (min.) | Meltwater Volume (mls.) ||
| | CaCl₂ and Surfactant | CaCl₂ |
|---|---|---|
| 8 | 15 | 9 |
| 16 | 20 | 14 |
| 24 | 21.5 | 15 |
| 32 | 22.5 | 16 |

*Example V*

This example reports the results achieved when 5 grams of rock salt (−4 +10 mesh) coated with about 0.08 weight percent of a surfactant, having the formula shown below, was placed on ice. The surfactant corresponded to the formula:

$$HO(C_2H_4O)_a(C_3H_6O)_b(C_2H_4O)_cH$$

where $a$ and $c$ are integers sufficiently large so that oxyethylene constituents from 10 to 90 weight percent of the total molecular weight of the compound and $b$ is an integer sufficiently large to provide a molecular weight of at least 900 for the oxypropylene base. Surface active agents of this type are marketed by Wyandotte Chemicals Corporation under the trademark Pluronic.

Using the same method as described in Example I, an ice melting composition was prepared by coating sodium chloride pellets (−4 +10 mesh) with 0.08 percent by weight of the sodium chloride of a material corresponding to the above formula in which the oxypropylene had a molecular weight of about 1750 and the oxyethylene content was 20 weight percent of the total molecular weight of the compound.

The above ice melting composition was used in tests exactly as described in Example I. The results of these tests shown below clearly reveal the superior ice melting properties of the composition as compared to untreated rock salt.

TABLE V

| Time (min.) | Meltwater Volume (mls.) ||
| | NaCl and Surfactant | NaCl |
|---|---|---|
| 16 | 2.5 | 0 |
| 24 | 5.5 | 0 |
| 32 | 8.5 | 1 |
| 40 | 11 | 3 |
| 48 | 13 | 5 |
| 56 | 14 | 6.5 |
| 64 | 15 | 8 |
| 72 | 16 | 9 |

*Example VI*

An aqueous solution containing 0.08 weight percent, based on the weight of the calcium chloride, of the Pluronic surfactant used in the test described in Example V was sprayed onto the surface of calcium chloride pellets (−4 +16 mesh) and the resulting ice melting composition used in tests as described in Example I. The results of these tests are shown below and record the superiority of the product of this invention over untreated calcium chloride.

TABLE VI

| Time (min.) | Meltwater Volume (mls.) | |
|---|---|---|
| | CaCl₂ and Surfactant | CaCl₂ |
| 8 | 15 | 9 |
| 16 | 20 | 14 |
| 24 | 21 | 15 |
| 32 | 21.5 | 16 |

*Example VII*

This example demonstrates the superior ice melting compositions obtained by coating sodium chloride pellets with a surfactant corresponding to the formula:

$$R\text{---}Ar\text{---}O\text{---}(C_2H_4O)_nH$$

where R is a hydrocarbon radical having 3 to 15 carbon atoms, Ar is a phenylene, diphenylene or naphthylene radical and $n$ is an integer sufficiently large so that the oxyethylene group is 10 to 90 weight percent of the total molecular weight of the compound.

An ice melting composition was prepared by coating rock salt (−4 +10 mesh) with 0.08 weight percent of nonylphenoxy(polyoxyethylene)ethanol of about 63 percent by weight of oxyethylene. This composition was then tested as described in Example I. The superior ice melting properties of this composition are shown below:

TABLE VII

| Time (min.) | Meltwater Volume (mls.) | |
|---|---|---|
| | NaCl and Surfactant | NaCl |
| 8 | 1.5 | 0 |
| 16 | 7 | 0 |
| 24 | 11 | 0 |
| 32 | 13.5 | 1 |
| 40 | 15.5 | 3 |
| 48 | 17 | 5 |
| 56 | 18 | 6.5 |
| 64 | 19 | 8 |
| 72 | 19.5 | 9 |
| 80 | 20.5 | 10 |

*Example VIII*

This example shows that surfactants as described in Example VII can be combined with calcium chloride pellets (−4 +16 mesh) to produce an ice melting composition which is superior to calcium chloride.

An aqueous solution of nonylphenoxy(polyoxyethylene)ethanol having about 63 percent by weight of oxyethylene was sprayed onto the surface of calcium chloride pellets until the pellets contained about 0.08 weight percent of the surfactant. The pellets were then added to the surface of ice as described in Example I. The superior ice melting properties of the composition are evidenced by the results of such tests.

TABLE VIII

| Time (min.) | Meltwater Volume (mls.) | |
|---|---|---|
| | CaCl₂ and Surfactant | CaCl₂ |
| 8 | 13 | 9 |
| 16 | 19 | 14 |
| 24 | 20.5 | 15 |
| 32 | 21.5 | 16 |

*Example IX*

This example demonstrates the effectiveness of ice melting compositions prepared by coating sodium chloride pellets with a surface active agent conforming to the formula:

$$Y(\text{---}P\text{---}E\text{---}H)_x$$

where Y is the nucleus of an organic reactive hydrogen compound containing $x$ reactive hydrogen atoms and having up to 6 carbon atoms, $x$ is an integer, P is a hydrophobic polyoxyalkylene chain having an oxygen/carbon atom ratio of not more than 0.40, the molecular weight of P and the value of $x$ being such that the molecule, excluding E, has a molecular weight of at least about 400–900 and up to 25,000, and E is a hydrophilic heteric polyoxyalkylene chain which (1) contains oxyethylene groups and at least 5 percent by weight, of higher molecular weight oxyalkylene groups having at least 3 carbon atoms in their structure and (2) has an average oxygen/carbon atom ratio of greater than 0.40, E being present in the composition to the extent that it constitutes from 5 to 90 weight percent of the total composition.

The hydrophobic element of these compounds is a polyoxyalkylene polymer in which at least most of the individual oxyalkylene groups contained therein have at least 3 carbon atoms in their structure. An essential characteristic of the hydrophobic element of the compounds is that the total hydrophobic alkylene oxide ingredient therein has an average oxygen/carbon atom ratio of not greater than 0.40. Since oxypropylene groups have an oxygen/carbon atom ratio of 0.33, the oxyalkylene ingredient used in making the hydrophobic portion of the compositions can be propylene oxide or mixtures thereof with ethylene oxide or butylene oxide or other higher molecular weight alkylene oxides with the proportions used being such that the oxygen/carbon atom ratio does not exceed 0.40.

The hydrophilic elements of these compounds are polymeric chains of oxyethylene groups having higher molecular weight oxyalkylene groups which contain at least 3 carbon atoms in their structure randomly and intermittently distributed therein. Since the oxypropylene group is the group most frequently incorporated in the hydrophilic chain with the oxyethylene groups, henceforth, for the sake of convenience in description, such hydrophilic chains are referred to, at times, simply as heteric polyoxyethylene-polyoxypropylene chains. It will be recognized, however, that wherever this term is used other higher oxyalkylene groups such as the oxybutylene group, the oxyamylene and the oxystyrene group, may be used in lieu of the oxypropylene group.

These conjugated polyoxyalkylene compounds have a "conjugated" or blocked polymer structure and are prepared by first condensing the hydrophobic alkylene oxide ingredient, described above, with an organic reactive hydrogen compound containing one or a plurality of reactive hydrogen atoms and having up to about 6 carbon atoms to prepare a hydrophobic polyoxyalkylene intermediate having a molecular weight of at least about 400–900, and subsequently condensing therewith a mixture of ethylene oxide and a higher molecular weight alkylene oxide. The mixture of ethylene oxide and higher molecular weight alkylene oxide employed should contain at least about 5 weight percent of the higher molecular weight alkylene oxide but must have an average oxygen/carbon atom ratio of greater than 0.40.

The molecular weight required in the hydrophobic polyoxyalkylene polymer to obtain surface active properties depends upon both the number of carbon atoms in the alkylene oxide or oxides used in making the hydrophobic polyoxyalkylene intermediate and the reactive hydrogen compound used in initiating the polymerization of the hydrophobic alkylene oxide ingredient. When the hydrophobic polyoxyalkylene intermediate is prepared by condensing propylene oxide with a reactive hydrogen compound containing only one reactive hydrogen atom, a minimum molecular weight of about 400 is required. Where, however, the reactive hydrogen compound contains a plurality of reactive hydrogen atoms, the hydrophobic polyoxypropylene intermediate must have a molecular weight of at least about 900. When the hydrophobic polyoxyalkylene intermediate is prepared by condensing butylene oxide with a reactive hydrogen compound containing a plurality of reactive hydrogen atoms, a molecular weight of about 500 is required.

As noted heretofore, the hydrophobic polyoxyalkylene intermediate is prepared by condensing an alkylene oxide ingredient having an oxygen/carbon atom ratio of less than 0.40, such as propylene oxide, with a reactive hydrogen compound containing at least one, and preferably not more than about 6, reactive hydrogen atoms and having up to 6 carbon atoms. Since the reactive hydrogen compound constitutes only a small proportion of the total composition, it ordinarily does not have a significant influence on the properties thereof. In other words, the particular reactive hydrogen compound employed in preparing the conjugated polyoxyalkylene compounds is not critical so long as it furnishes at least one reactive hydrogen atom, and useful surface active compositions are obtained regardless of the particular reactive hydrogen compound employed in the preparation of the hydrophobic polyoxyalkylene polymer.

The term "reactive hydrogen atom" is well known and clearly understood by those skilled in the art. However, to remove any possible ambiguity in this regard, the term "reactive hydrogen atom," as used herein, includes any hydrogen atom fulfilling the following two conditions:

(1) It is sufficiently labile to open the epoxide ring of 1,2-propylene oxide or ethylene oxide, and
(2) It reacts with methyl magnesium iodide to liberate methane in the classical Zerewitinoff reaction (see Niederl and Niederl, Micromethods of Quantitative Organic Analysis, p. 263, John Wiley & Sons, New York City, 1946).

The reactive hydrogen atoms which will fulfill the above two conditions are normally activated by being a member of a functional group containing an oxygen atom, e.g. a hydroxyl group, a phenol group, a carboxylic acid group; a basic nitrogen atom, e.g. an amine group, a hydrazine group, an imine group, an amide group, a guanidine group, a sulfonamide group, a urea group, a thiourea group; or a sulfur atom, e.g. a mercaptan, a thiophenol, a thiocarboxylic acid, hydrogen sulfide. Alternatively, certain hydrogen atoms may be activated by proximity to carbonyl groups such as those found in cyanoacetic esters, acetoacetic esters, malonic esters, as is well known in the art.

Thus, the lower molecular weight, monohydroxy alcohols constitute one one class of reactive hydrogen compounds that is especially useful in preparing the subject compositions. Such alcohols can have up to about 6, inclusive, carbon atoms per molecule and examples of these materials are methanol, n-propanol, n-butanol, n-hexanol, methyl ether of ethylene glycol and phenol.

The lower molecular weight aliphatic polyhydric alcohols constitute another class of reactive hydrogen compounds that is especially useful in preparing the compositions under discussion. Such alcohols can have from about 2 to 6, inclusive carbon atoms per molecule, and examples of these materials are ethylene glycol, propylene glycol, 2,3-butylene glycol, 1,3-butylene glycol, 1,5-pentanediol, 1,6-hexanediol, glycerol, trimethylolpropane, sorbitol pentaerythritol and the like. Another class of reactive hydrogen compounds that can be used is the alkylamines and alkylene polyamines having at least 2 reactive hydrogen atoms, such as methylamine, ethylamine, propylamine, butylamine, hexylamine, ethylenediamine, 1,6-hexanediamine, diethylenetriamine, and the like. Also, such cyclic amines as piperazine, 2-methylpiperazine and 2,5-dimethylpiperazine can also be used. Amides constitute a further class of such reactive hydrogen compounds, such as acedamide, succinamide and benzenesulfonamide. A still further class of such reactive hydrogen compounds is the di- and polycarboxylic acids, such as adipic acid, succinic acid, glutaric acid, aconitic acid, diglycollic acid, and the like.

Another class of reactive hydrogen compounds that can be used is secondray amines, such as dimethylamine, diethylamine, morpholine, N-ethylbutylamine, dipropylamine, N-methylethylamine, N-ethylpropylamine, and the like. A further class of reactive hydrogen compounds is N-monosubstituted amides, such as methyl acetamide, N - ethylbenzenesulfonamide, N - propylethanolsulfonamide, and the like. A still further class is monocarboxylic acids, such as acetic acid, benzoic acid, butanoic acid, and the like. Still other such reactive hydrogen compounds can also be used so long as the particular compound meets the requirements set forth, i.e., relatively low molecular weight, reactivity with ethylene oxide and at least one reactive hydrogen atom.

The amount of the hydrophobic alkylene oxide ingredient used has been expressed in terms of the molecular weight of the resulting reactive hydrogen compound-alkylene oxide condensate. It is to be understood that the term "molecular weight" means theoretical molecular weight throughout this specification and the claims. In expressing the molecular weight for the hydrophobic polyoxyalkylene intermediate, the molecular weight of the reactive hydrogen compound is included. This molecular weight should be, as stated earlier, at least about 400–900 and can range up to about 25,000 or higher.

The heteric polyoxyethylene chains employed in the compositions contains 40–95% oxyethylene groups and 5–60% oxypropylene groups or other higher molecular weight oxyalkylene groups, such as oxybutylene, oxystyrene or mixtures of such oxyalkylene groups. Where the heteric polyoxyethylene chains contain substantially less than about 5% of higher molecular weight oxyalkylene groups, the compositions do not differ materially from compositions in which the hydrophilic chains are straight polyoxyethylene chains. When 5–10% of oxypropylene groups, for example, are included in the heteric polyoxyethylene chains, the physical properties of the compositions are materially improved (as compared with compositions containing straight polyoxyethylene chains) in that they have lower viscosity and greater clairity than the compounds containing straight polyoxyethylene chains as the hydrophilic element. As the percent oxypropylene groups in the heteric polyoxyethylene chains is increased, the physical properties of the compositions such as viscosity, clarity and change in physical state from solid to paste to liquid show still further improvement, but the surface active properties are also noticeably modified. A practical upper limit on the amount of higher molecular weight alkylene oxide in the mixture with ethylene oxide used to produce the heteric polyoxyethylene chains is approximately 60%, for when this value is exceeded by any substantial amount the surface active properties of the compositions fall off rapidly.

It will be apparent from the foregoing discussion that the compositions can be prepared using specifically, a mixture of propylene oxide and ethylene oxide for condensation with an active hydrogen compound to form the hydrophobic polymer base and using a mixture of ethylene oxide and propylene oxide for condensation with the hydrophobic polymer base to form the hydrophilic chains, and thereby, a novel surface active compound. Furthermore, it has been disclosed that the relative percentages of propylene oxide and ethylene oxide employed in the first step to form the hydrophobic base can fall in the range of 60 to 95 weight percent propylene oxide and 40 to 5 weight percent ethylene oxide, while the relative percentages of propylene oxide and ethylene oxide employed in the mixture to form the hydrophilic chains can fall in the range of 95 to 40 weight percent ethylene oxide and 5 to 60 weight percent propylene oxide. It is thus apparent that, by choosing the extremes of these ranges, a product can be obtained which contains 60 weight percent propylene oxide and 40 weight percent ethylene oxide in both the hydrophobic base and the hydrophilic chains. Such a composition would not have surface activity and is not contemplated by the present invention.

Fully equivalent products are obtained when a higher molecular weight alkylene oxide other than propylene oxide is employed in the preparation of the heteric hydrophilic chains. Examples of higher molecular weight alkylene oxides that may be employed include butylene oxide, amylene oxide, cyclohexene oxide, styrene oxide, etc. As in the case of propylene oxide, it is necessary to have at least 5%, by weight, of the higher molecular weight oxyalkylene units in the chain to obtain significant improvements in the properties of the compounds. Unlike propylene oxide, however, it is not feasible to incorporate 60% of the higher molecular weight oxyalkylene groups in the hydrophilic chains were the higher molecular weight oxyalkylene group contains 4 or more carbon atoms in its structure. Instead, the upper limit on the higher molecular weight oxyalkylene content must be reduced so that the hydrophilic chains have an average oxygen/carbon atom ratio of greater than 0.40. Surface active agents of this type are fully described in U.S. Patent 3,101,374, the disclosure of which is incorporated herein by reference.

An ice melting composition was prepared by coating sodium chloride pellets ($-4 +10$ mesh) with a surfactant of the above formula in which Y was trimethylolpropane, P was a heteric polyoxypropylene/polyoxyethylene chain containing 90 percent polyoxypropylene and having a total molecular weight of about 3200 and E was a heteric polyoxyethylene/polyoxypropylene chain containing 90 percent polyoxyethylene and having a total molecular weight of about 1280. The pellets were coated with about 0.08 weight percent of said surfactant and then added to the surface of ice as described in Example I. The superior ice melting properties of this composition are seen in the following data.

TABLE IX

| Time (min.) | Meltwater Volume (mls.) | |
|---|---|---|
| | NaCl and Surfactant | NaCl |
| 8 | 1.5 | 0 |
| 16 | 7.5 | 0 |
| 24 | 12 | 0 |
| 32 | 15 | 1 |
| 40 | 17.5 | 3 |
| 48 | 19 | 5 |
| 56 | 20 | 7 |
| 64 | 21 | 8 |
| 72 | 21.5 | 9 |

*Example X*

The surfactant used in the test described in Example IX was coated in the amount of 0.08 weight percent on the surface of calcium chloride pellets ($-4 +16$ mesh) and the resulting ice melting composition used in tests as described in Example I. The results of these tests are shown below and demonstrate the superiority of the product of this invention over calcium chloride.

TABLE X

| Time (min.) | Meltwater Volume (mls.) | |
|---|---|---|
| | $CaCl_2$ and Surfactant | $CaCl_2$ |
| 8 | 13 | 9 |
| 16 | 17.5 | 14 |
| 24 | 19 | 15 |
| 32 | 20 | 16 |

*Example XI*

This example demonstrates the superior ice melting properties of sodium chloride pellets which have been coated with a surfactant corresponding to the formula:

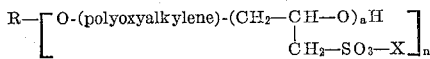

where R, together with attached oxygen, is the residue of an alcohol having from 1 to 6 carbon atoms and from 1 to 6 hydroxyl groups. Examples of such alcohols are methanol, hexanol and phenol; glycols such as butylene glycol, diethylene glycol and triethylene glycol; ethyl ethers of glycols such as the methyl and butyl ether of ethylene glycol, and aliphatic polyols such as trimethylolpropane, glycerol and 1,2,6-hexanetriol. Mixtures of such alcohols can also be used. The polyoxyalkylene shown in the formula represents a chain of bivalent oxyalkylene radicals having from 2 to 4 carbon atoms, including mixtures of such radicals containing not more than 50 percent by weight of oxyethylene radicals, having a molecular weight, including the molecular weight of the alcohol and multiplied by the number $n$ of about 1000 to 10,000. The letter $n$ represents an integer from 1 to 6 while $a$ represents the molar ratio of sulfonated halohydrin groups per hydroxyl group in said alcohol and is in the range of 1 to 4 and X is a cation.

Examples of suitable polyalkylene oxides are ethylene oxide, propylene oxide, butylene oxide, including its various isomers, and methyl glycide. Mixtures of these oxides can be used but the mixture shouldn't contain more than about 50 weight percent of ethylene oxide. The cation appearing in the composition may be sodium, potassium, calcium, magnesium, ammonium, or alkylol-substituted ammonium salts in which each alkylol contains from 2 to 3 carbon atoms. The production of the above described surfactants may be accomplished by the use of procedures and reaction conditions commonly employed in the surfactant art. Basically, the compositions are prepared by condensing the alcohol with the alkylene oxide to produce a polyether polyol. This polyol is then reacted with epihalohydrin to produce a halohydrin ether. Finally, the halohydrin ether is sulfonated by reacting it with an aqueous suspension of an alkali metal sulfite. A further description of this class of surfactant and its preparation is found in U.S. patent application, Ser. No. 206,204, filed June 29, 1962, and entitled "Polyether Hydroxysulfonate Surface Active Agents," the disclosure of which is incorporated herein by reference.

An ice melting composition was prepared by coating sodium chloride pellets ($-4 +10$ mesh) with 0.08 weight percent, based on the weight of the pellets, of a surfactant corresponding to the formula shown above in which R was propylene glycol, the polyoxyalkylene was polypropylene oxide of about 2000 molecular weight, X was sodium, $n$ was 2, and $a$ was 1.2. The ice melting composition was then tested as described in Example I. The results tabulated below show the superior ice melting properties of this composition.

TABLE XI

| Time (min.) | Meltwater Volume (mls.) | |
|---|---|---|
| | NaCl and Surfactant | NaCl |
| 8 | 1.5 | 0 |
| 16 | 7 | 0 |
| 24 | 11 | 0 |
| 32 | 13.5 | 1 |
| 40 | 15.5 | 3 |
| 48 | 17 | 5 |
| 56 | 18 | 7 |
| 64 | 19 | 8 |
| 72 | 19.5 | 9 |
| 80 | 20 | 10 |

Example XII

This example demonstrates the superior ice melting composition produced by coating the surface of calcium chloride pellets (—4 +16 mesh) with 0.08 percent by weight of the same surfactant which was used in the ice melting composition described in Example XI. This data shown below resulted from tests identical to that described in Example I.

TABLE XII

| Time (min.) | Meltwater Volume (mls.) | |
| --- | --- | --- |
| | $CaCl_2$ and Surfactant | $CaCl_2$ |
| 8 | 12.5 | 9 |
| 16 | 17 | 14 |
| 24 | 18.5 | 15 |
| 32 | 19 | 16 |

Example XIII

This example illustrates the effectiveness of ice melting compositions prepared by coating sodium chloride pellets with alkaryl sulfonates of the formula $R-Ar-SO_3-X$ where R is a hydrocarbon radical having from 1 to 20 carbon atoms, Ar is an aromatic nucleus such as phenylene, diphenylene and naphthylene and X is cation such as hydrogen, sodium, lithium, ammonium, and potassium.

An ice melting composition was prepared as described in Example I by coating sodium chloride pellets (—4 +10 mesh) with 0.08 percent by weight of kerylbenzene sodium sulfonate. The composition was then added to the surface of ice as described in Example I. The results of this test are shown below:

TABLE XIII

| Time (min.) | Meltwater Volume (mls.) | |
| --- | --- | --- |
| | NaCl and Surfactant | NaCl |
| 8 | 2 | 0 |
| 16 | 7 | 0 |
| 24 | 11 | 0 |
| 32 | 13.5 | 1 |
| 40 | 16 | 3 |
| 48 | 17.5 | 5 |
| 56 | 19 | 7 |
| 64 | 20 | 8 |
| 72 | 20.5 | 9 |
| 80 | 21 | 10 |

Although the present invention has been described and exemplified in terms of its preferred embodiments, those skilled in the art will readily appreciate that modifications and variations can be made without departing from the scope of the invention.

From the foregoing description and examples showing results actually obtained in the laboratory, it is believed that the compositions and method of this invention constitute a substantial advance over the prior art. Stated broadly, this invention discloses new ice melting compositions consisting of solid particles of sodium chloride, calcium chloride and mixtures of calcium and sodium chloride which are at least partially coated with a surfactant.

We claim:

1. An ice melting composition, soluble in meltwater produced by action of said composition on ice, consisting essentially of solid particles of a material selected from the group consisting of sodium chloride, calcium chloride and mixtures thereof, said chloride particles having their surfaces at least partially coated with a surfactant having the formula:

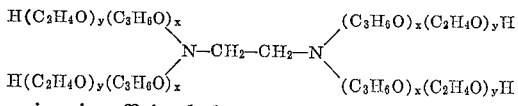

wherein $x$ is sufficiently large so as to provide a combined molecular weight of the oxypropylene chains of at least about 900 and wherein $y$ is sufficiently large so that the oxyethylene constitutes from 10 to 90 weight percent of the total molecular weight of the compound.

2. An ice melting composition, soluble in meltwater produced by action of said composition on ice, comprising solid particles of a material selected from the group consisting of sodium chloride, calcium chloride and mixtures thereof, said chloride particles having their surfaces at least partially coated with a surfactant having the formula:

wherein $b$ is an integer sufficiently large to provide a molecular weight of at least 900 for the oxypropylene base and wherein $a$ and $c$ are integers sufficiently large so that oxyethylene constitutes from 10 to 90 weight percent of the total molecular weight of the compound.

3. An ice melting composition, soluble in meltwater produced by action of said composition on ice, comprising solid particles of a material selected from the group consisting of sodium chloride, calcium chloride and mixtures thereof, said chloride particles having their surfaces at least partially coated with a surfactant having the formula:

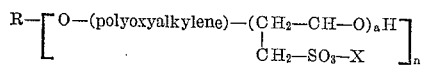

(1) wherein R, together with attached oxygen, is the residue of an alcohol having from 1 to 6 carbon atoms and from 1 to 6 hydroxyl groups;

(2) wherein $n$ is an integer from 1 to 6, inclusive;

(3) wherein $a$ represents the molar ratio of sulfonated halohydrin groups per hydroxyl group in said alcohol and is in the range of about 1 to 4;

(4) wherein polyoxyalkylene represents a chain of bivalent oxyalkylene radicals, the molecular weight of said chain, including the molecular weight of said alcohol and multiplied by the number $n$, defined above, being in the range from about 1000 to 10,000, said oxyalkylene radicals being selected from the group consisting of oxyalkylene radicals having from 2 to 4, inclusive, carbon atoms and mixtures thereof, and said chain containing not more than about 50 weight percent based on the weight of said chain, of oxyethylene radicals; and (5) where in X is a cation selected from the group consisting of sodium, potassium, ammonium, calcium, magnesium and alkylol-substituted ammonium in which each alkylol contains from 2 to 3 carbon atoms.

4. An ice melting composition, soluble in meltwater produced by action of said composition on ice, comprising solid particles of a material selected from the group consisting of sodium chloride, calcium chloride and mixtures thereof, said chloride particles having their surfaces at least partially coated with a surfactant having the formula:

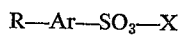

wherein R is a hydrocarbon radical having from 1 to about 20 carbon atoms, wherein Ar is an aromatic nucleus selected from the group consisting of phenylene, diphenylene and naphthylene and X is an ion selected from the group consisting of hydrogen, sodium, lithium, ammonium and potassium.

5. An ice melting composition, soluble in meltwater produced by action of said composition on ice, consisting essentially of solid particles of a material selected from the group consisting of sodium chloride, calcium chloride and mixtures thereof, said chloride particles having their surfaces at least partially coated with a surface active agent, said surface active agent being a mixture of conjugated polyoxyalkylene compounds, said compounds consisting of the nucleus of an organic reactive hydrogen compound having from 1 to 6 reactive hydrogen atoms and being selected from the group consisting of mono- and polyhydric alkanols having up to 6 carbon atoms per molecule, alkyl ethers of alkanols having up to 6 carbon atoms per molecule, primary alkylamines having up to 6 carbon atoms per molecule, secondary dialkylamines having up to 6 carbon atoms per molecule, alkylene polyamines having up to 6 carbon atoms per molecule, piperazine, carbon-substituted methylpiperazines, alkane amides having up to 6 carbon atoms per molecule, N-alkyl alkane amides having up to 6 carbon atoms per molecule, benzenesulfonamide, N-ethylbenzenesulfonamide, N-propylethanesulfonamide, and mono- and polycarboxylic alkanoic acids having up to 6 carbon atoms per molecule, a hydrophobic polyoxyalkylene chain having an average oxygen/carbon atom ratio of not more than 0.40 attached at one end thereof to the nucleus of said organic reactive hydrogen compound at the site of each of its reactive hydrogen atoms, said hydrophobic polyoxyalkylene chain consisting of polymers of oxyalkylene groups selected from the group consisting of oxypropylene, oxybutylene, oxyamylene, oxystyrene, mixtures of said oxyalkylene groups with each other and mixtures of said oxyalkylene groups with oxyethylene groups, the molecular weight of said organic reactive hydrogen compound and attached hydrophobic polyoxyalkylene chains being in the range of at least about 400–900 and up to about 25,000, and a heteric hydrophilic polyoxyethylene chain attached to the other end of each of said hydrophobic polyoxyalkylene chains, said heteric hydrophilic polyoxyethylene chain consisting essentially of 95–40 weight percent of oxyethylene groups and 5–60 weight percent of higher molecular weight oxyalkylene groups selected from the group consisting of oxypropylene, oxybutylene, oxystyrene and mixtures thereof, said heteric hydrophilic polyoxyethylene chain having an average oxygen/carbon atom ratio of greater than 0.40 and the weight of said heteric hydrophilic polyoxyethylene chain being such as to constitute from 5–90 weight percent of the mixture of compounds.

6. The process of melting ice which comprises contacting said ice with an ice melting composition, soluble in meltwater produced by action of said composition on ice, consisting essentially of solid particles of a material selected from the group consisting of sodium chloride, calcium chloride, and mixtures thereof, and said solid particles having their surfaces at least partially coated with a surfactant selected from the group consisting of anionic and oxyalkylene nonionic surfactants.

7. The process of melting ice which comprises contacting said ice with an ice melting composition, soluble in meltwater produced by action of said composition on ice, consisting essentially of solid particles of a material selected from the group consisting of sodium chloride, calcium chloride and mixtures thereof, and said solid particles having their surfaces at least partially coated with a surfactant selected from the group consisting of polyoxyethylene glycol, polyoxyethylene polyoxypropylene glycol, polyoxyethylene polyoxypropylene adducts of ethylene diamine, polyether hydroxysulfonate, nonyl phenylethoxylate and sodium tetrapropylene benzenesulfonate.

References Cited by the Examiner

UNITED STATES PATENTS

| 1,787,888 | 1/1931 | White et al. | 252—70 |
| 2,539,012 | 1/1951 | Diamond et al. | 252—384 |
| 2,731,353 | 1/1956 | Fain et al. | |

FOREIGN PATENTS

| 119,642 | 3/1945 | Australia. |
| 569,466 | 1/1959 | Canada. |
| 680,542 | 2/1964 | Canada. |

OTHER REFERENCES

McCutcheon: Detergents and Emulsifiers (1963), pp. 13, 150, 112, and 132.

LEON D. ROSDOL, Primary Examiner.

JULIUS GREENWALD, ALBERT T. MEYERS, Examiners.

J. D. WELSH, Assistant Examiner.